UNITED STATES PATENT OFFICE.

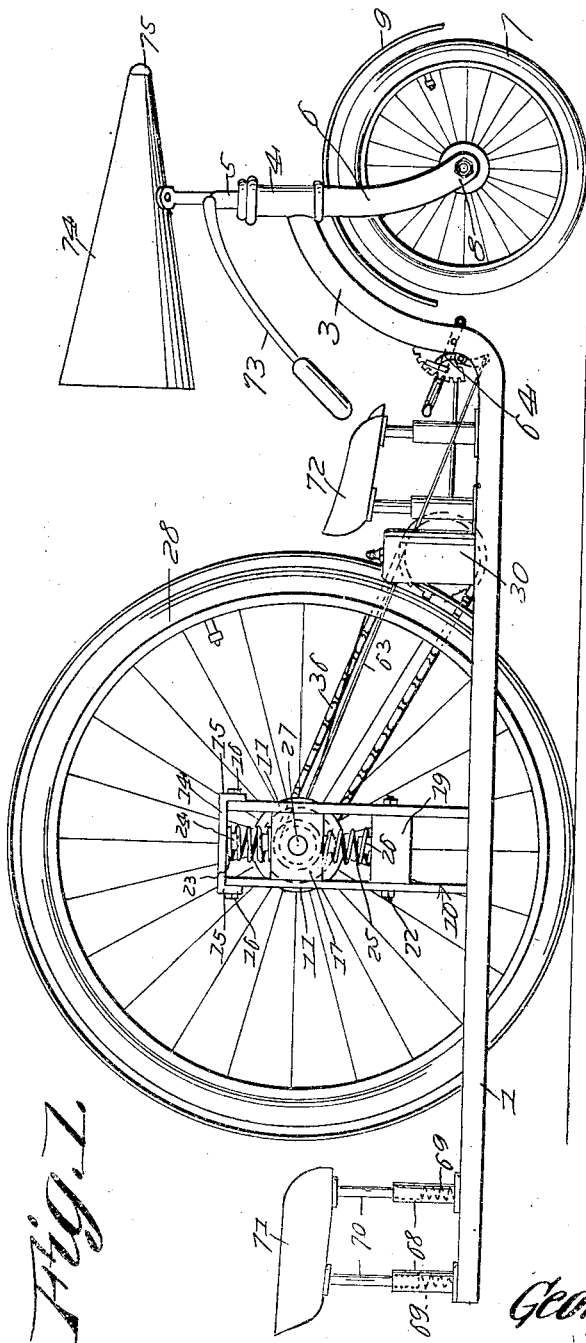

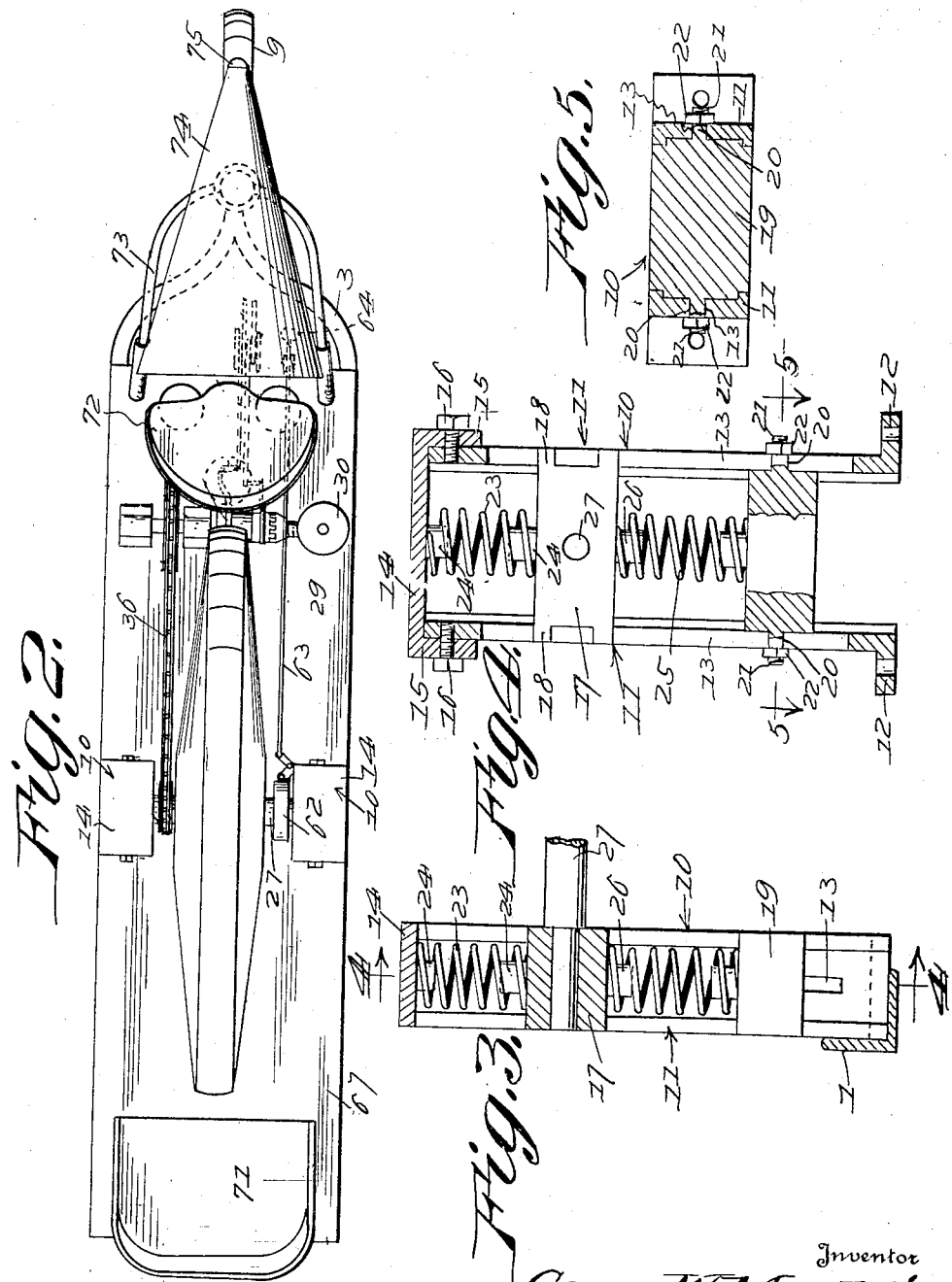

GEORGE W. MOULDIN, OF DANVILLE, ILLINOIS.

MOTORCYCLE.

1,350,878.   Specification of Letters Patent.   Patented Aug. 24, 1920.

Application filed March 22, 1918. Serial No. 224,025.

*To all whom it may concern:*

Be it known that I, GEORGE W. MOULDIN, a citizen of the United States of America, residing at Danville, in the county of Vermilion and State of Illinois, have invented new and useful Improvements in Motorcycles, of which the following is a specification.

The present invention comprehends generally improvements in that class of inventions known as motor vehicles and more particularly relates to a motorcycle.

It is the primary aim and object to provide a device of the above mentioned character designed so that practically all of the weight of the frame and the occupants will be supported in the main rear wheel so as to insure the efficient operation of the device in general while the relation of the parts is such that the device is capable of obtaining a relatively high speed.

As an equally important object the present invention contemplates the provision of improved resilient means for yieldingly supporting the frame with respect to the main wheel to insure of an easy riding vehicle regardless of the speed thereof, while such resilient means is capable of being adjusted so as to vary the tension thereof as desired.

Other improvements and novel details in the construction and arrangement of the various parts of the apparatus will be brought out more in detail in the description to follow, which for a clear understanding of the invention should be considered in connection with the accompanying drawings forming a part hereof, and wherein is disclosed for the purpose of illustration a convenient and satisfactory embodiment of the invention. It is to be noted in this connection that minor changes may be made without departing from the principle of operation of the various parts.

The invention is clearly illustrated in the accompanying drawings, in which:

Figure 1 is a side elevation of the complete vehicle.

Fig. 2 is a top plan view thereof.

Fig 3 is a vertical transverse sectional detail of the resilient means which yieldingly supports the main rear axle.

Fig. 4, is a longitudinal section of the same taken in the line 4—4 of Fig. 3, and looking in the direction indicated by the arrow Fig. 5 is a section on the line 5—5 of Fig. 4.

Similar characters of reference are employed in all of the above described views, to indicate corresponding parts.

Referring now, more particularly, to the accompanying drawings, there is provided a frame of a substantially rectangular configuration comprising spaced side bars 1, the forward ends of which are curved inwardly toward each other and extended upwardly and curved forwardly as indicated by the numeral 3 and formed at their terminals with a vertically arranged sleeve 4 in which is mounted for partial rotary movement the shank 5 which in turn extends upwardly from the intermediate portion of a supporting fork 6. It is against the upper surface of this intermediate portion of the fork that the sleeve is supported while the fork in turn is supported by a front wheel 7 which is journaled rotatably between the outer ends thereof as at 8. A mud guard 9 is formed with the intermediate portion of the fork and extends inwardly and rearwardly thereof and is positioned in close relation with the upper periphery of the wheel 7.

In order to yieldingly support the main portion of the frame 1 spaced supports each indicated in its entirety by the numeral 10 are employed. Each support consists of spaced standards 11 which have their lower ends formed with feet 12 secured to the side bars, the main portions of the standards being formed with opposed vertical slots 13 for a purpose that will hereinafter become apparent, while the upper ends are connected together by a cross bar 14, the respective ends of the said cross bar being formed with downwardly extending flanges 15 which are secured to the upper ends of the standards by suitable fasteners 16. Arranged between the adjacent standards 11 are bearings 17 which are formed with outwardly projecting lugs 18 on the opposite side edges and these lugs are positioned to slide in the slots 13 in the standards and coöperate with the slots in guiding the vertical sliding movement of the bearings 17 in the supports 10. Also arranged between each of the adjacent standards are blocks 19 from the outer faces of the opposite sides of which project trunnions 20 desirably square in cross section. These trunnions are arranged for sliding movement in slots 13 and have their outer projecting ends reduced and threaded as at 21 for receiving nuts 22, the latter being designed to be clamped in frictional engagement with the outer faces of the standards 11 to insure the maintenance of the blocks in various positions of adjustment. Coil expansion springs 23 are arranged between the bearings 17 and the cross bars 14 having their respective ends disposed about lugs 24 formed on the under surfaces of the cross bars 14 and the upper surfaces of the bearings 17. Other coil expansion springs 25 are disposed between the under surfaces of the bearings and the blocks 19 and have their ends arranged about lugs 26 formed on the under surfaces of the bearings and on the upper edges of the blocks, as indicated in the drawing. An axle 27 is journaled in the bearings 17 while carried by the axle medially of the bearings and between the side bars of the frame is a main supporting wheel 28. By the construction and arrangement described it is apparent that the springs in the supports serve to yieldingly suspend the frame from the main axle 27 while the tension of the springs may be varied to suit the requirements by merely adjusting the blocks 19 in the supports.

The vehicle is driven through the instrumentality of an engine 30 operatively connected with the driving wheels through a chain 36, these driving connections being provided with suitable control generally indicated in Fig. 2 of the drawings but unnecessary of description here.

With a view of providing suitable means for enabling the driver to stop the vehicle a band brake 62 is operably connected to the main axle 27 while a connecting rod 63 is operably connected at one end to the brake and at the opposite end to a foot operable lever 64 which is pivotally mounted near the forward end of the frame.

The rear portion 67 of the platform 29 supports a series of vertically arranged cylinders 68. Coil springs 69 are arranged in the cylinders and serve as means for yieldingly supporting the posts 70 which depend from the rear seat 71. A similarly mounted seat 72 is positioned on the front platform of the frame in such a manner that the several manually operable levers may be conveniently reached by the driver when on the seat.

In order to steer or guide the vehicle handle bars 73 extend downwardly from the shank 5. A frusto conical wind shield 74 is mounted on the handle bars while a sight glass 75 is positioned in the forward restricted end of the shield.

Having thus fully described the invention what is claimed and desired to be secured by Letters Patent is:

In a motor vehicle, a frame, upstanding supports carried on opposite sides of the frame, each support embodying a pair of spaced standards formed with longitudinal slots therein, a cross-bar spanning the standards at their upper ends and connecting with the same, a bearing positioned between the two standards of each pair and provided with end projecting lugs entering and having a sliding engagement in said slots, blocks mounted between the standards comprising each pair, each block being provided with end trunnions entering the slots of its respective standards and having threaded extremities projecting beyond the standards, nuts engageable on said threaded extremities and bearing against the outer faces of the standards, whereby the blocks may be adjusted and away from the cross-bars.

In testimony whereof I affix my signature.

GEORGE W. MOULDIN.